(12) United States Patent
Nachman et al.

(10) Patent No.: US 11,533,282 B1
(45) Date of Patent: Dec. 20, 2022

(54) SPECIFYING AND TESTING OPEN COMMUNICATION PROTOCOLS

(71) Applicant: WhatsApp LLC, Menlo Park, CA (US)

(72) Inventors: George Nachman, Sunnyvale, CA (US); Arnaud Frugier, Redwood City, CA (US)

(73) Assignee: WhatsApp LLC, Menlo Park, CA (US)

(*) Notice: Subject to any disclaimer, the term of this patent is extended or adjusted under 35 U.S.C. 154(b) by 0 days.

(21) Appl. No.: 17/465,148

(22) Filed: Sep. 2, 2021

(51) Int. Cl.
H04L 51/046 (2022.01)
H04L 9/40 (2022.01)
H04L 67/133 (2022.01)

(52) U.S. Cl.
CPC ........ *H04L 51/046* (2013.01); *H04L 63/0428* (2013.01); *H04L 67/133* (2022.05)

(58) Field of Classification Search
CPC ..... H04L 63/0428; H04L 67/40; H04L 43/50; G06F 11/3664; G06F 11/3684; G06F 11/3672; G06F 11/26; G06F 11/3668
See application file for complete search history.

(56) References Cited

U.S. PATENT DOCUMENTS

| | | | | |
|---|---|---|---|---|
| 8,365,206 B1* | 1/2013 | McCarten | ............ | G06F 9/4488 718/1 |
| 9,104,814 B1* | 8/2015 | Mompoint | .......... | G06F 11/3668 |
| 2006/0277533 A1* | 12/2006 | Fiske | ........................ | G06F 8/41 717/137 |
| 2007/0168917 A1* | 7/2007 | Janson | ................ | G06F 11/3604 717/101 |
| 2010/0115585 A1* | 5/2010 | Cohen | ..................... | G06F 9/547 709/219 |
| 2010/0192128 A1* | 7/2010 | Schloegel | ........... | G06F 11/3684 717/125 |
| 2013/0167123 A1* | 6/2013 | Dura | ..................... | G06F 11/3624 717/127 |
| 2016/0085666 A1* | 3/2016 | Jordan | ................ | G06F 11/3692 714/38.1 |
| 2017/0300402 A1* | 10/2017 | Hoffner | ............... | G06F 11/3612 |
| 2021/0160237 A1* | 5/2021 | Rozner | ............... | H04L 63/0272 |
| 2021/0400512 A1* | 12/2021 | Agarwal | ............ | H04M 7/0078 |

* cited by examiner

*Primary Examiner* — Tonia L Dollinger
*Assistant Examiner* — Linh T. Nguyen
(74) *Attorney, Agent, or Firm* — McDermott Will & Emery LLP

(57) ABSTRACT

Systems, methods, apparatuses, and computer program products to specify and test open communication protocols. A messaging client executing on a processor of a client device may generate a request stanza based on a first specification file of a plurality of specification files for the messaging client. The messaging client may validate the request stanza based on one or more parameters specified by the first specification file. The messaging client may invoke a response handler for the request stanza. The messaging client may receive a response stanza from a server. The response handler may process the response stanza. The messaging client may display an output of the processing of the response handler.

18 Claims, 13 Drawing Sheets

```
<rpc name="GetTime" originator="client">
  <request>
    <iq id=":stanzaID" type="get" xmlns="example">
      <time format="epoch|ISO|RFC"/>
    </iq>
  </request>
  <response name="Success">
    <iq type="result" id="${iq.id}">
      <time format="${iq.time.format}" ts=":int(0,inf)"/>
    </iq>
  </response>
  <response name="Error">
    <iq type="error" id="${iq.id}">
      <error code="500" text="internal-server-error"/>
    </iq>
  </response>
</rpc>
```

302 — request
304 — Success response
306 — Error response 102-1

FIG. 3

```
<mixin name="paymentInfo">
    <payment currency="USD" available_payment="card|cash">
        <id>
            :string(1,20)
        </id>
    </payment>
</mixin>
```
402

```
<products>
    <shirt>
        <payment smax:mixins="paymentInfo"/>
    </shirt>
```
404

```
    <pants>
        <payment smax:mixins="paymentInfo" discount="50% off"/>
    </pants>
```
406

```
    <jacket>
        <payment smax:mixins="paymentInfo"/>
    </jacket>
</products>
```
408

```
void OnUserTap()
{
    // boilerplate
    ...
    // Create handler for each response
    Runnable[] handlers = {
        (stanza) -> { print("The time is %s.", stanza.getTS()) },
        (stanza) -> { print("Something went wrong. Try again.") }
    };

// Creating our request stanza using SMAX-generated code
    GetTimeRequest request = CreateGetTimeRequest(GetTimeFormat.EPOCH, handlers)

// More client code
    ...
    // Sending the GetTimeRequest using SMAX-generated code
    GetTimeRPC.GetTimeRequestSend(request, userData)
```

FIG. 5

```
<mock name="GetTime">
  <request>
    <!-- When the client sends a stanza matching this pattern: -->
    <iq xmlns="example" type="get" id=":stanzaID">
      <time format="epoch"/>
    </iq>
  </request>
  <response name="Success">
    <!-- Inject this fake server response: -->
    <iq type="result" id="${iq.id}">
      <time format="${iq.time.format}" ts="1234"/>
    </iq>
  </response>
</mock>
```

602 — (request block)
604 — (response block)
600

FIG. 6

Request
```
<iq id="489302" type="get" xmlns="example">
  <time format="epoch"/>
</iq>
```
702

Response
```
<iq type="result" id="489302">
  <time format="epoch" ts="1617400045"/>
</iq>
```
704

FIG. 7

SPECIFYING AND TESTING OPEN COMMUNICATION PROTOCOLS

BACKGROUND

Messaging systems may use open communication protocols. Often, however, open communication protocols are not defined by formal specification languages. Instead, these protocols are often documented informally. The lack of a formal specification language may constrain engineering efforts for a given messaging system. For example, the lack of a formal specification language may lead to inconsistencies in the messaging systems, which may lead to errors, bugs, and security vulnerabilities. These and other problems also increase the amount of resources and time needed to develop and maintain the messaging system.

BRIEF SUMMARY

In one aspect, a method, includes generating, by a messaging client executing on a processor of a client device, a request stanza based on a first specification file of a plurality of specification files for the messaging client, validating, by the messaging client, the request stanza based on one or more parameters specified by the first specification file, invoking, by the messaging client, a response handler for the request stanza, receiving, by the messaging client, a response stanza from a server, processing, by the response handler, the response stanza, and displaying, by the messaging client, an output of the processing of the response handler. Other embodiments are described.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 illustrates an aspect of the subject matter in accordance with one embodiment.

FIG. 4 illustrates an aspect of the subject matter in accordance with one embodiment.

FIG. 5 illustrates an aspect of the subject matter in accordance with one embodiment.

FIG. 6 illustrates an aspect of the subject matter in accordance with one embodiment.

FIG. 7 illustrates an aspect of the subject matter in accordance with one embodiment.

DETAILED DESCRIPTION

Figure 1:
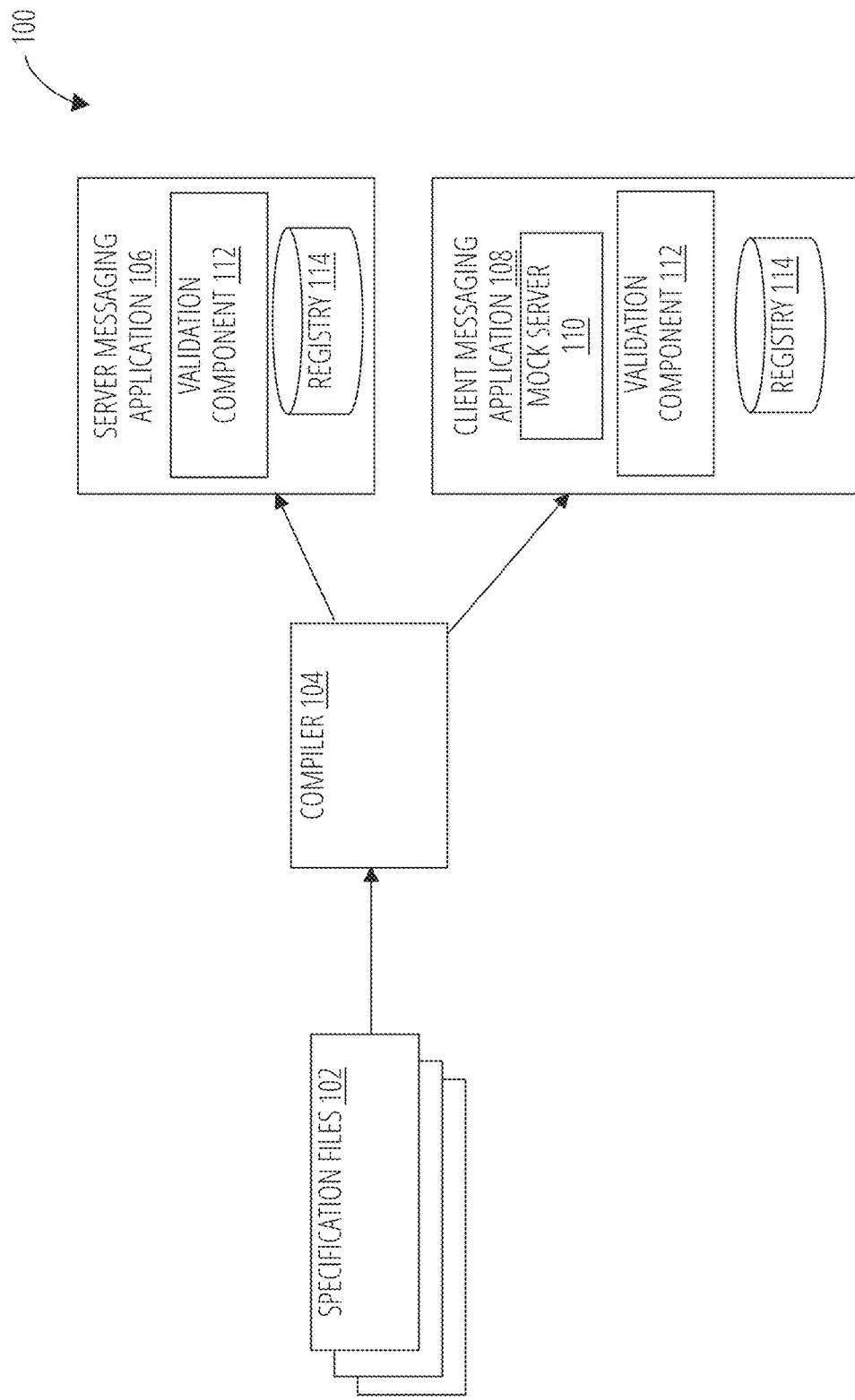
FIG. 1 illustrates an aspect of the subject matter in accordance with one embodiment.

Embodiments disclosed herein provide techniques for formally specifying, implementing, and testing messages sent in messaging systems that use open messaging protocols. These messages may be referred to as "stanzas" herein, which includes all client-server communications. Generally, one or more specification files may be defined to formally specify a plurality of features provided by the messaging system. A given specification file may include all scenarios for one or more features of the messaging system implemented according to the specification file. Once defined, a compiler may convert a given specification file into executable code that can run in a messaging client and/or a corresponding server-side application. The generated code may be used by the messaging system to construct stanzas, thereby ensuring the messaging system only constructs valid stanzas. Furthermore, the code may be used to parse stanzas to verify that all inputs and other elements of a given stanza are valid. The executable code may also perform validation on the server-side to prevent clients from sending malicious stanzas to other clients. Doing so may prevent buffer overflows, malicious attacks, and/or exploitation of other security vulnerabilities.

In some embodiments, the generated code may further include an algorithm that determines the identity of an incoming stanza from the constituent elements of the stanza. The algorithm allows the code to determine which specification file defines the properties of the stanza. Once identified, the code may use the specification file to validate the stanza to ensure the stanza conforms to the specification file.

Embodiments disclosed herein may further provide an advanced testing mechanism where the client application includes a mock server component. Generally, the client application may transmit requests to the mock server component. The mock server component may respond to the client as if it was an actual server-side application. Doing so allows manual and/or automatic testing to occur in isolation without requiring a working network connection to the server. Furthermore, because the mock server component is implemented using code that is generated by a specification file, all response stanzas generated by the mock server component are valid.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 123 illustrated as components 123-1 through 123-a (or 123a) may include components 123-1, 123-2, 123-3, 123-4, and 123-5. The embodiments are not limited in this context.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

FIG. 1 is a schematic illustrating a system 100. Generally, the system 100 includes a plurality of specification files 102 and a compiler 104. A computing system for storing the specification files 102 and executing the compiler 104 to generate a server messaging application 106 and a client messaging application 108 is not pictured for the sake of clarity.

The specification files 102 formally specify requirements for messages, or stanzas, generated by components of a messaging system, such as an end-to-end encrypted (E2EE) messaging system. The messaging system may include a client messaging application 108 and a corresponding server messaging application 106 generated by the compiler 104 based on the specification files 102. Conventionally, the client messaging application 108 and the server messaging application 106 may communicate using stanzas according to an open communication protocol, such as the XMPP protocol. Therefore, the specification files 102 may formally define a specification for the stanzas to improve the security, reliability, and scalability of the features provided by the server messaging application 106 and the client messaging application 108. Embodiments are not limited in these contexts.

Collectively, the specification files 102 contain all possible scenarios for all features provided by the server messaging application 106 and the client messaging application 108. In some embodiments, the specification files 102 may include distinct specification files 102 for the server messaging application 106 and distinct specification files 102 for the client messaging application 108. In some embodiments, the specification files 102 may be written according to the extensible markup language (XML). In some embodiments, each specification file 102 includes one request element, zero or more response elements, a name attribute, and an originator attribute (e.g., the server messaging application 106, client messaging application 108, and/or mock server 110 is the originator of a given stanza constructed using the constraints specified by the specification file 102). In some embodiments, a request element has a single request stanza as a child element. In some embodiments, a response element may have one response stanza as a child element. In other embodiments, a response element has zero child elements. If a specification file 102 includes multiple responses, each response may include a respective name attribute. Embodiments are not limited in this context.

The compiler 104 is any type of computer program that translates source code written in one programming language into another language, such as a high-level language readable by humans into a lower-level language (e.g., assembly language) to create an executable program. For example, by compiling the specification files 102, the compiler 104 may generate one or more components of the server messaging application 106, the client messaging application 108, the validation component 112 of the server messaging application 106, the validation component 112 of the client messaging application 108, the registry 114 of the server messaging application 106 the registry 114 of the client messaging application 108, and the mock server 110 of the client messaging application 108. In some embodiments, the compiler 104 may generate application-level network interfaces for an application and/or component thereof. The compiler 104 may operate according to any programming language. For example, the compiler 104 may generate code in the C language, Erlang, Java, and the like. Embodiments are not limited in this context.

Generally, the compiler 104 may generate strongly typed classes for the client messaging application 108 and the validation component 112. Based on the specification files 102, the compiler 104 may generate components of the server messaging application 106 and the client messaging application 108 that include code to ensure that only valid stanzas can be constructed. The validation component 112 may be configured to validate any stanza generated by the server messaging application 106 and the client messaging application 108 according to one or more rules, templates, or any other requirement or parameter specified by the specification files 102. For example, if a specification file 102 requires that a stanza include a specific data type (e.g., a character, string, etc.), the validation component 112 may process the stanza to ensure that the stanza includes the data type. If the stanza does not include the required data type, the validation component 112 may invalidate (e.g., drop) the stanza and refrain from further processing of the stanza. Otherwise, the validation component 112 may permit further processing of the stanza.

The registries 114 are data stores which store an indication of a plurality of remote procedure calls (RPCs) for stanzas generated by the client messaging application 108 and/or server messaging application 106. Doing so allows the client messaging application 108 and/or server messaging application 106 to track requests for which a response is expected. Each entry in the registry 114 may include a unique key of the stanza, which may be referred to as a "stanza ID". In some embodiments, the stanza ID uniquely identifies an instance of a stanza generated by the client messaging application 108 and/or server messaging application 106. Stated differently, each stanza is associated with a unique stanza ID, and multiple instances of the same message are associated with different unique stanza IDs. For example, if the stanza ID of a first stanza generated by the client messaging application 108 to return the current time is "12345", the client messaging application 108 may store an indication of the stanza ID of "12345" in the registry 114. Similarly, if the client messaging application 108 generates a second stanza to return the current time, the stanza ID of the second stanza may be "67890". In some embodiments, the registry 114 may include an indication of the RPC and any response handlers (e.g., the request to return time, and any associated response handlers) associated with the stanza ID. Furthermore, a given request or response type may be associated with a unique identifier, which may be referred to as an "SMAX ID". Therefore, a stanza may include the stanza ID which uniquely identifies the stanza and the SMAX ID that uniquely identifies the request and/or response type of the stanza. The registry 114 may therefore include an indication of the SMAX ID of the stanza.

The validation component 112 may use the stanza ID and/or the SMAX ID of a stanza to determine the requirements for the stanza, e.g., as defined by one or more corresponding specification files 102. In some embodiments, however, a stanza may not include an SMAX ID, and the stanza ID may be unrecognized. Advantageously, the validation component 112 may implement a decision tree algorithm that is configured to determine any rules, RPCs, response handlers, and any other attribute for the stanza based on the contents of the stanza. Doing so allows the validation component 112 to verify a given stanza even if the SMAX ID of the stanza is not specified and the stanza ID is not recognized (e.g., not present in the registry 114). Furthermore, doing so allows the validation component 112 to determine the appropriate response handlers for the associated RPC. In some embodiments, one response handler is invoked. The response handler may include any type of response handler, including a possible "failure" response handler. For example, the "failure" response handler may be invoked when an invalid response is received and/or a response is not received (e.g., a network connection is lost before the server responds to the client). Advantageously, the failure response handler makes it easier to write application code.

The specification files 102 may further specify different client-server interactions. For example, the compiler 104 may generate code based on the specification files 102 to allow manual or automated testing by developers. In some embodiments, the client-server interactions are between the server messaging application 106 and the client messaging application 108. Advantageously, however, the mock server 110 of the client messaging application 108 is configured to emulate the functionality of the server messaging application 106. Doing so may be beneficial, e.g., when a network connection between the server messaging application 106 and client messaging application 108 is not available. Doing so allows the developer to run tests in isolation without requiring a working network connection to the server messaging application 106. Furthermore, the server messaging application 106 may not be as up-to-date as the client messaging application 108. However, by including the mock server 110, the mock server 110 may be configured to include the most recent and up-to-date functionality required to process tests with the client messaging application 108.

The compiler 104 may further generate additional metadata (not pictured) for analysis. For example, the compiler 104 may expand "include" statements and/or remove indirection to flatten the specification files 102 for analysis. The compiler 104 may also implement a markdown validator that validates examples in documentation against one or more specification files 102. The compiler 104 may also generate structured query language (SQL) code that facilitates building tools and analysis modules. Further still, the compiler 104 may generate a document that may be used to generate graphical visualizations of any portion of code generated by the compiler 104. For example, the compiler may generate a document in the DOT language that may be used by the Graphviz® tool to generate a graphical visualization of any code portions.

Figure 2:
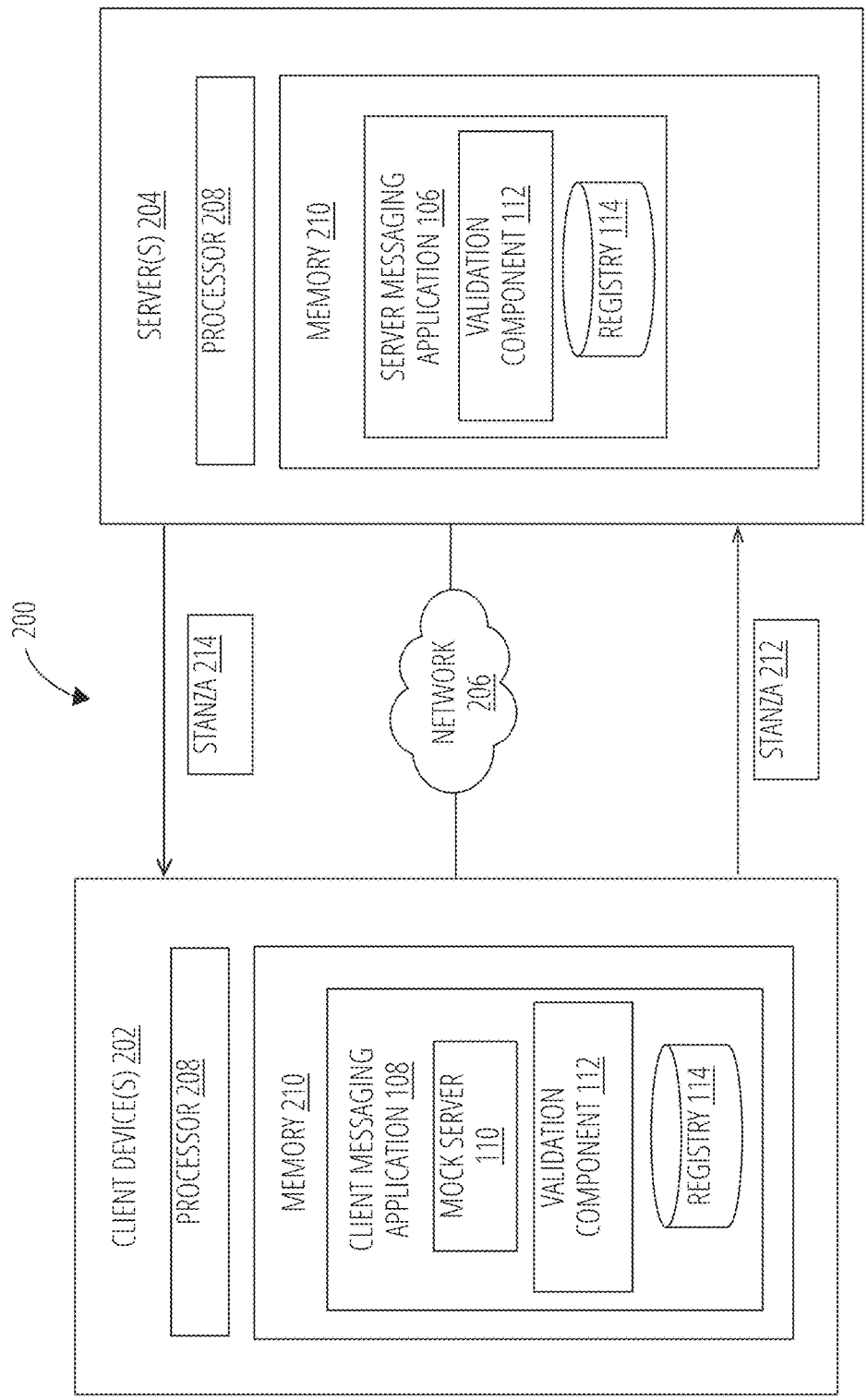
FIG. 2 illustrates an aspect of the subject matter in accordance with one embodiment.

FIG. 2 illustrates a system 200, according to various embodiments. As shown, the system 200 includes one or more client devices 202 and one or more servers 204 communicably coupled via a network 206. The client devices 202 and the servers 204 each include a respective processor 208 and a memory 210. As shown, the client device 202 includes an instance of the client messaging application 108 generated by the compiler 104, while the server 204 includes an instance server messaging application 106. As shown, the client messaging application 108 may generate a request stanza 212 that is formatted according to the requirements of one or more specification files 102. The client messaging application 108 may then transmit the request stanza 212 to the server 204 (although in some embodiments, the client messaging application 108 may transmit the request stanza 212 to the mock server 110).

Similarly, the server messaging application 106 may generate a response stanza 214 in response to the request stanza 212. The response stanza 214 may be based on one or more specification files 102. The server messaging application 106 may then transmit the response stanza 214 to the client messaging application 108. As stated, however, the mock server 110 may generate the response stanza 214 and provide the response stanza 214 to the server messaging application 106. Because the specification files 102 describe specific request/response pairs, the validation components 112 may process the stanza 212 and/or stanza 214 to ensure the stanzas are valid (e.g., conform with all requirements specified by the specification files 102). Advantageously, because the server messaging application 106 and the client messaging application 108 (including the mock server 110) can implement support for the same language, new specification files 102 can be used to generate code in this language, and developers can test their source code against the same cases.

Furthermore, the server messaging application 106 and/or mock server 110 may also generate request stanzas. In such examples, the client messaging application 108 may return a response stanza to the request stanza generated by the server messaging application 106 and/or mock server 110. For example, a user may be added to a group messaging thread. In such an example, the server messaging application 106 and/or mock server 110 may generate a notification request stanza to the client messaging application 108 and the client messaging application 108 is expected to respond with an acknowledgment stanza in response.

FIG. 3 is a schematic 300 illustrating a portion of an example specification file 102-1 for returning the current time to the client messaging application 108, according to various embodiments. Generally, a developer or other use may define the example specification file 102-1, which includes a request portion 302, a first response portion 304, and a second response portion 306. Generally, the request portion 302 specifies one or more parameters for requesting the current time from the server messaging application 106. Similarly, the response portion 304 includes one or more parameters for a "success" condition, e.g., when the server messaging application 106 is able to return the current time to the client messaging application 108. The response portion 306 includes one or more parameters for an "error" condition, e.g., when the server messaging application 106 encounters an error in processing the request, and is therefore unable to return the current time to the client messaging application 108. Embodiments are not limited in these contexts.

In some embodiments, a specification file 102 may have different rules for element names according to the underlying rules of the specification file 102. For example, if the specification file 102 is written in XML, element names may not begin with digits. Therefore, to enable use of different element names, such as element names that begin with digits, a namespace may be created for names that otherwise violate one or more rules. In such an embodiment, each member of the namespace may begin with a predefined character, such as the underscore character (e.g., the name "2fac" may be written in XML as "<badname: _2fac>"). When the client messaging application 108 and/or server messaging application 106 encounters such an element name, the underscore may be removed for matching, injection, validation, and code verification. Doing so allows the name "2fac" to be used in the specification file 102.

Furthermore, in some embodiments, a specification file 102 may include a reference to another specification file 102. For example, using an "include" statement in a first specification file 102 may import the content of a second specification file 102, and so on. In operation, when the second specification file 102 is imported, the "include" statement in the first specification file 102 may be replaced with the actual contents of the second specification file 102.

FIG. 4 is a schematic 400 illustrating a portion of a specification file 102-2, according to various embodiments. More specifically, the specification file 102-2 depicts one or more "mixins", which provide a way to define additional structure for a stanza. Often, values may be bundled together. Mixins allow the combination of two or more stanzas to enable code reuse, express high-level concepts, and bundle different values together. Furthermore, mixins may be used to eliminate the duplication of code in multiple places. However, when two or more mixins are specified by an element, the two or more mixins must be compatible. Stated differently, the mixins cannot assign different types to the same attribute and/or element value. However, in some embodiments, the mixins may assign different string-typed values to the same attribute, or different generic client identifier values. Furthermore, mixins provide techniques for selecting among different bundles of mutually exclusive features.

The portion 402 of FIG. 4 depicts an example mixin element for payments. In some embodiments, one or more attributes of the mixin element 402 may be optional. For example, the "time format" attribute of the mixin element 402 may be optional. In such examples, a default time format may be used if the optional "time format" attribute is not specified. Portions 404, 406, and 408 may define specifications for different items that can be purchased, namely shirts, pants, and jackets, respectively. Advantageously, each portion 402, 404, and 406 incorporates the payment mixin element 402. Doing so allows each portion 402, 404, and 406 to include the features of the mixin element 402 without expressly reciting the features of mixin element 402 within each portion 402, 404, and 406. Stated differently, portions 402, 404, and 406 include the features of mixin element 402 without repeating or duplicating the specification of mixin element 402 within each of portions 402, 404, and 406. Doing so improves system performance by reducing the amount of computation, resources, and time needed to compile the specification file 102-2 and/or to compile and execute the corresponding server messaging application 106 and/or client messaging application 108.

FIG. 5 is a schematic 500 illustrating a portion of code generated by the compiler 104 based on a specification file 102, according to various embodiments. The code depicted in FIG. 4 may be implemented in the server messaging application 106 and/or the client messaging application 108. The code depicted in FIG. 4 may continue the previous example of the server messaging application 106 returning the current time to the client messaging application 108. As shown, a handler portion 502 includes two response handlers, e.g., a first handler for when the current time is returned to the client messaging application 108 (based on the "success" portion 304 of the specification file 102), and a second handler for when an error is encountered (based on the "error" portion 306 of the specification file 102).

A request portion 504 includes at least a portion of code used by the client messaging application 108 to request the time from the server messaging application 106 and/or the mock server 110. Similarly, a response portion 506 includes at least a portion of code used by the server messaging application 106 and/or the mock server 110 to return the current time to the client messaging application 108. Embodiments are not limited in these contexts.

FIG. 6 is a schematic 600 depicting at least a portion of a specification file 102 for the mock server 110, according to various embodiments. Generally, when in use, the mock server 110 may intercept stanzas generated by the client messaging application 108, perform the processing specified by the specification files 102 for the mock server 110, and inject a response provided to the client messaging application 108. To perform the processing, the mock server 110 may compare the contents of the stanza to one or more stanza templates, e.g., where the templates are based on the specification files 102 and/or code generated by the compiler 104 based on the specification files 102. For example, if the stanza includes attributes matching the values in the request portion 602, the mock server 110 may determine the rules for validating the stanza. The mock server 110 may then validate the stanza based on the one or more rules. If the stanza is validated, the mock server 110 may store an indication of the unique ID of the stanza and any associated RPCs and/or response handlers in the registry 114.

As shown, a request portion 602 includes one or more parameters for a request stanza to be generated by the client messaging application 108 to request the current time from the server messaging application 106. The request portion 602 includes one or more elements that the mock server 110 uses to identify a valid response. For example, if the request portion 602 is matched, the response portion 604 defines a valid response (e.g., the current time). The mock server 110 may then generate a response stanza based on the definitions of the response portion 604, and provide the response to the client messaging application 108.

FIG. 7 is a schematic 700 depicting example stanzas, according to various embodiments. As shown, the schematic 700 includes a request stanza 702 generated by a client messaging application 108 and a response stanza 704 generated by the server messaging application 106 and/or the mock server 110 of the client messaging application 108. The stanzas 702, 704 may be generated based on code generated by the compiler 104 based on one or more specification files 102. In the depicted examples, the request stanza 702 is generally related to a request to return the current time, while the response stanza 704 is a response indicating the current time.

For example, a graphical user interface (GUI) of the client messaging application 108 may include a portion where the current time may be displayed. Therefore, the request stanza 702 may be generated programmatically and/or responsive to user input specifying to display the current time in the client messaging application 108. Once received, the server messaging application 106 may process the 702 to determine an appropriate response, e.g., the response stanza 704 that includes the current time. Once received, the client messaging application 108 may process the response stanza 704 to display the current time. Embodiments are not limited in these contexts.

Figure 8:
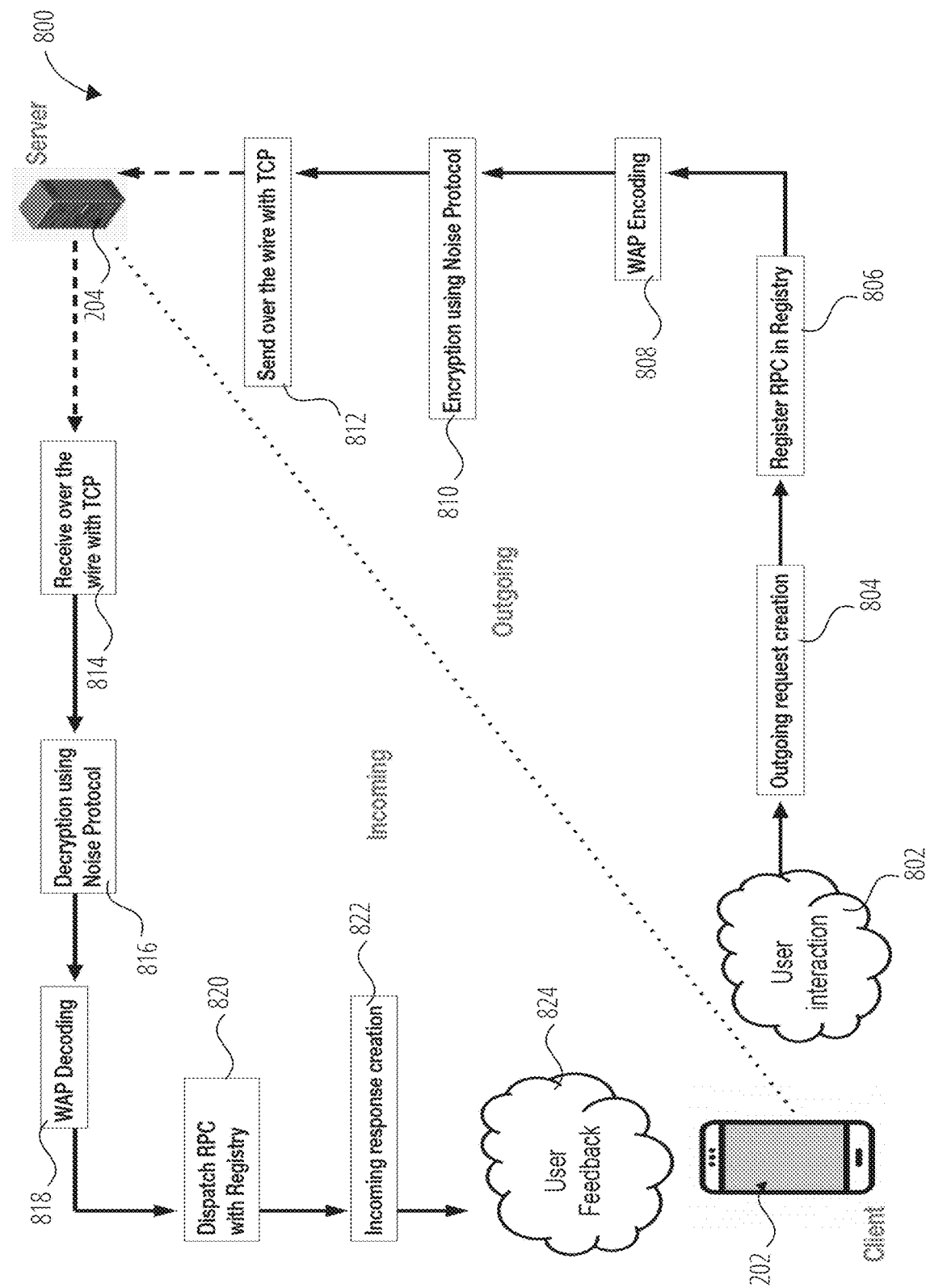
FIG. 8 illustrates an aspect of the subject matter in accordance with one embodiment.

FIG. 8 illustrates an example flow diagram 800, consistent with disclosed embodiments. The flow diagram 800 may include operations performed by the client messaging application 108 executing on a client device 202 and/or server messaging application 106 executing on a server 204. Although the operations depicted in FIG. 8 may include the server messaging application 106 as an example, the mock server 110 may perform the operations associated with the server messaging application 106 in FIG. 8. Embodiments are not limited in these contexts.

As shown, at block 802, a user may interact with the client messaging application 108 to perform a desired operation. For example, the user may select a GUI element of the client messaging application 108 for any suitable purpose, such as viewing contact information, accessing a page of the client messaging application 108, viewing the current time, and the like. At block 804, the client messaging application 108 generates an outgoing request stanza according to the specification files 102 for the associated operation. Doing so may include defining one or more attributes of the stanza and one or more child elements of the stanza based on the specification file 102 for the stanza. For example, the outgoing request stanza may be based on the request to receive the current time, and the attributes of the outgoing request stanza may be defined. At block 806, the validation component 112 of the client messaging application 108 validates the stanza based on one or more rules. If the validation component 112 validates the stanza, the validation component 112 may store an indication of the unique ID of the stanza and any associated RPCs and/or response handlers for the RPCs in the registry 114. The client messaging application 108 and/or validation component 112 may then invoke any identified response handlers. If, however, the unique ID is not identified, the validation component 112 may invoke the decision tree component to invoke the necessary response handlers.

At block 808, the client messaging application 108 may perform WAP encoding on the stanza generated at block 804. Generally, the WAP encoding is an encoding scheme to convert an XML-based stanza to a compact array of bytes, where each element of the stanza is represented using one or more bytes of the array. Doing so reduces the amount of data transmitted via the network. In some embodiments, common values of the stanza may be replaced by one or more dictionary entries. For example, a portion of a URL in the stanza (e.g., example.com) may be converted to a predefined value for the portion of URL specified in the dictionary. In some embodiments, the WAP encoding includes Unicode transformation format-8-bit (UTF-8) encoding. In some embodiments, user identifiers (e.g., username@example.com) in a stanza may be differentiated by using special tokens which are then encoded into the byte stream.

At block 810, the client messaging application 108 may encrypt one or more portions of the encoded stanza. The encryption may be performed according to any suitable encryption scheme, such as the Noise protocol framework, Transport Layer Security (TLS), and the like. At block 812, the client messaging application 108 transmits the encrypted stanza to the server 204 via the network 206, e.g., using the transmission control protocol (TCP). The server messaging application 106 executing on a server 204 may then receive the encrypted stanza and generate a response stanza corresponding to the request, e.g., a response stanza with an indication of the current time. The response stanza may be encoded, encrypted, and transmitted to the client messaging application 108.

At block 814, the client messaging application 108 may receive the response stanza from the server messaging application 106. At block 816, the client messaging application 108 may decrypt any encrypted portions of the response stanza. At block 818, the client messaging application 108 may decode the response stanza. At block 820, the client messaging application 108 dispatches the entry for the request stanza with the registry 114. As stated, if the stanza ID of the stanza is identified in the registry 114, the client messaging application 108 may invoke any associated response handlers (e.g., a response handler to process the server's response stanza which may include the current time). Otherwise, if the SMAX ID of the stanza is not specified and the stanza ID is not identified, the client messaging application 108 may invoke the decision tree of the validation component 112 to determine and invoke the appropriate response handlers. Once the response handlers are invoked, the entry for the stanza may be removed from the registry 114. At block 822, the client messaging application 108 generates a response based on the response stanza received from the server messaging application 106. For example, the response may include the current time to be displayed in the GUI of the client messaging application 108. At block 824, the user may optionally provide feedback and/or any other input in the client messaging application 108.

Figure 9:
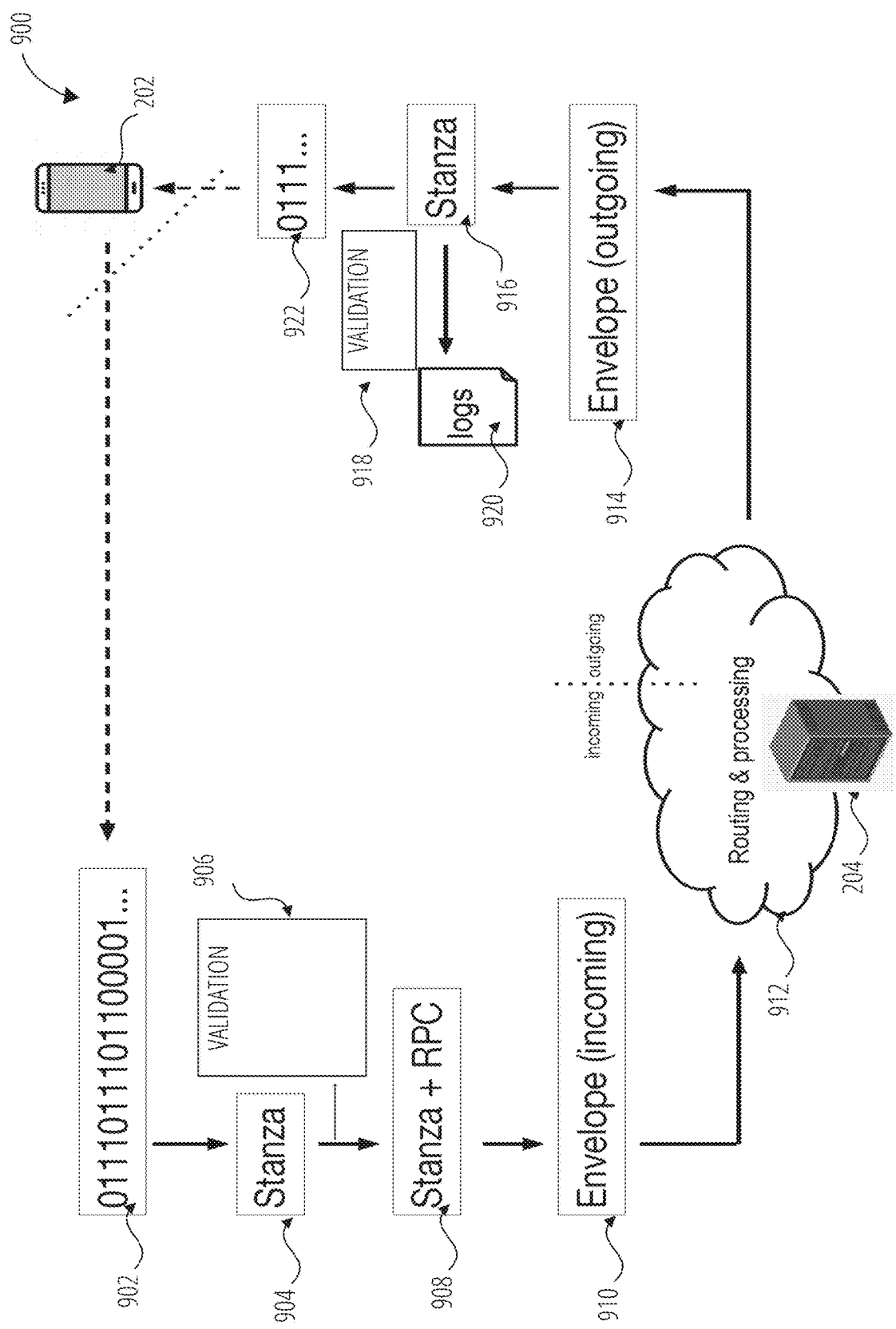
FIG. 9 illustrates an aspect of the subject matter in accordance with one embodiment.

FIG. 9 illustrates an example flow diagram 900, consistent with disclosed embodiments. The flow diagram 900 may include operations performed by the client messaging application 108 executing on a client device 202 and/or server messaging application 106 executing on a server 204. Although the operations depicted in FIG. 9 may include the server messaging application 106 as an example, the mock server 110 may perform the operations associated with the server messaging application 106 in FIG. 9. Embodiments are not limited in these contexts.

As shown, at block 902, the client messaging application 108 may generate one or more instructions and generate a stanza for the instructions at block 904. Doing so may include defining one or more attributes of the stanza and one or more child elements of the stanza based on the specification file 102 for the stanza. At block 906, the validation component 112 may validate the stanza according to one or more rules. If validated, the validation component 112 may store an indication of the stanza ID for the stanza and one or more RPCs and/or response handlers in the registry 114. At block 908, the stanza and any RPCs are determined. At block 910, the stanza and any RPCs are encoded into an envelope, which may be transmitted to the server messaging application 106. However, if the stanza is not validated, e.g., the stanza does not conform to one or more rules, the validation component 112 may drop the stanza and refrain from further processing of the stanza. Doing so ensures that only validly formatted stanzas are transmitted in the messaging system 200.

The server messaging application 106 may then process the envelope at block 912. At block 914, the server messaging application 106 may generate a response envelope which is transmitted to the client messaging application 108. At block 916, the client messaging application 108 may decode and/or decrypt the envelope to determine the response stanza from the server messaging application 106. At block 918, the validation component 112 may validate the response stanza determined at block 916. Doing so may include identifying an entry in the registry 114 that includes a unique stanza ID of the response stanza. If an entry is not identified and the SMAX ID is not specified in the stanza, the validation component 112 may invoke the decision tree algorithm to determine any RPCs and/or response handlers for the response stanza. Doing so allows the validation component 112 to invoke the appropriate response handlers for the response stanza to process the response stanza. The validation component 112 may further store any output in one or more log files at block 920. At block 922, a response is generated by the response handlers based on the validated stanza. Doing so allows an appropriate response to be effected in the client messaging application 108.

Figure 10:
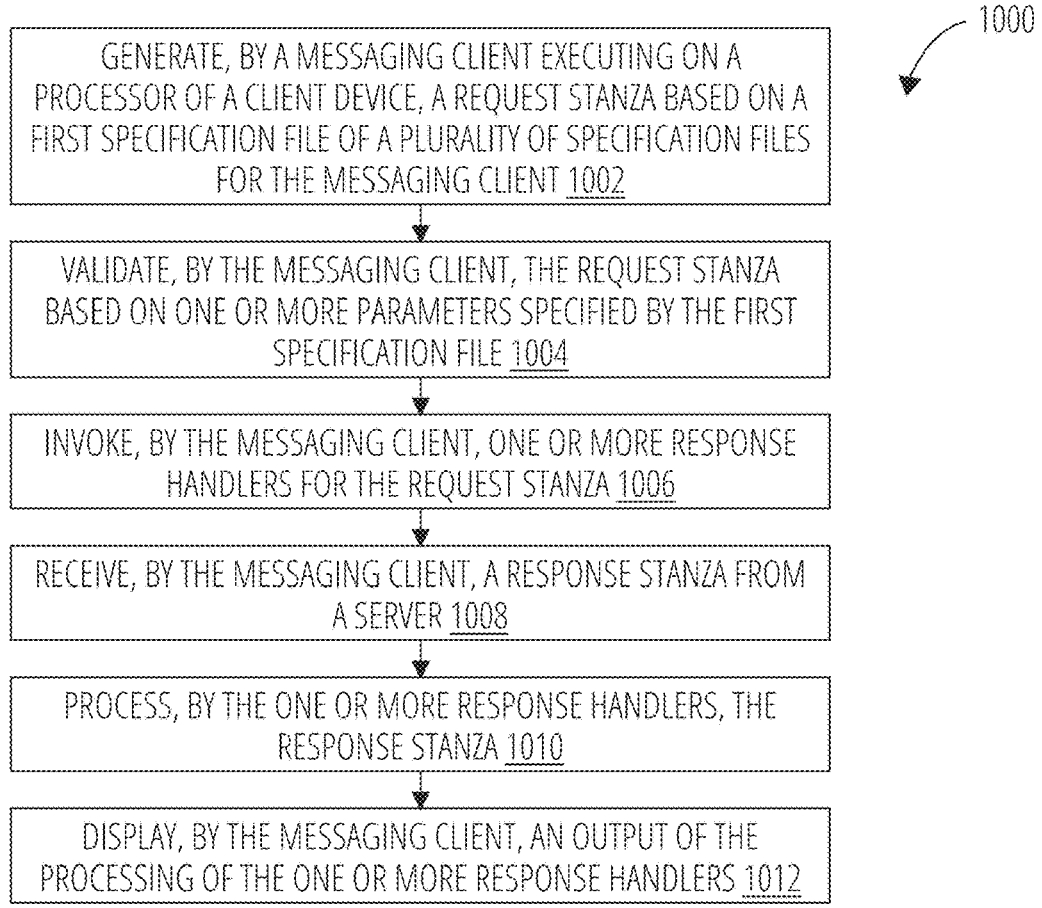
FIG. 10 illustrates a routine 1000 in accordance with one embodiment.

FIG. 10 illustrates an example routine 1000, consistent with disclosed embodiments. The flow routine 1000 may include operations performed by the client messaging application 108 executing on a client device 202 and/or server messaging application 106 executing on a server 204. Although the operations depicted in FIG. 10 may include the server messaging application 106 as an example, the mock server 110 may perform the operations associated with the server messaging application 106 in FIG. 109. Embodiments are not limited in these contexts.

In block 1002, routine 1000 generates, by a client messaging applications 108 executing on a processor of a client device, a request stanza based on a first specification file 102 of a plurality of specification files 102 for the client messaging application 108. In block 1004, routine 1000 validates, by a validation component 112 of the client messaging application 108, the request stanza based on one or more parameters specified by the first specification file 102. In block 1006, routine 1000 invokes, by the validation component 112 of the client messaging application 108, one or more response handlers for the request stanza. In block 1008, routine 1000 receives, by the client messaging application 108, a response stanza from a server, such as the server messaging application 106 and/or the mock server 110. In block 1010, routine 1000 processes, by the one or more response handlers, the response stanza. In block 1012, routine 1000 displays, by the client messaging application 108, an output of the processing of the one or more response handlers.

As stated, the embodiments described above may be performed by a messaging system, an example of which is next described with reference to FIG. 11.

Figure 11:
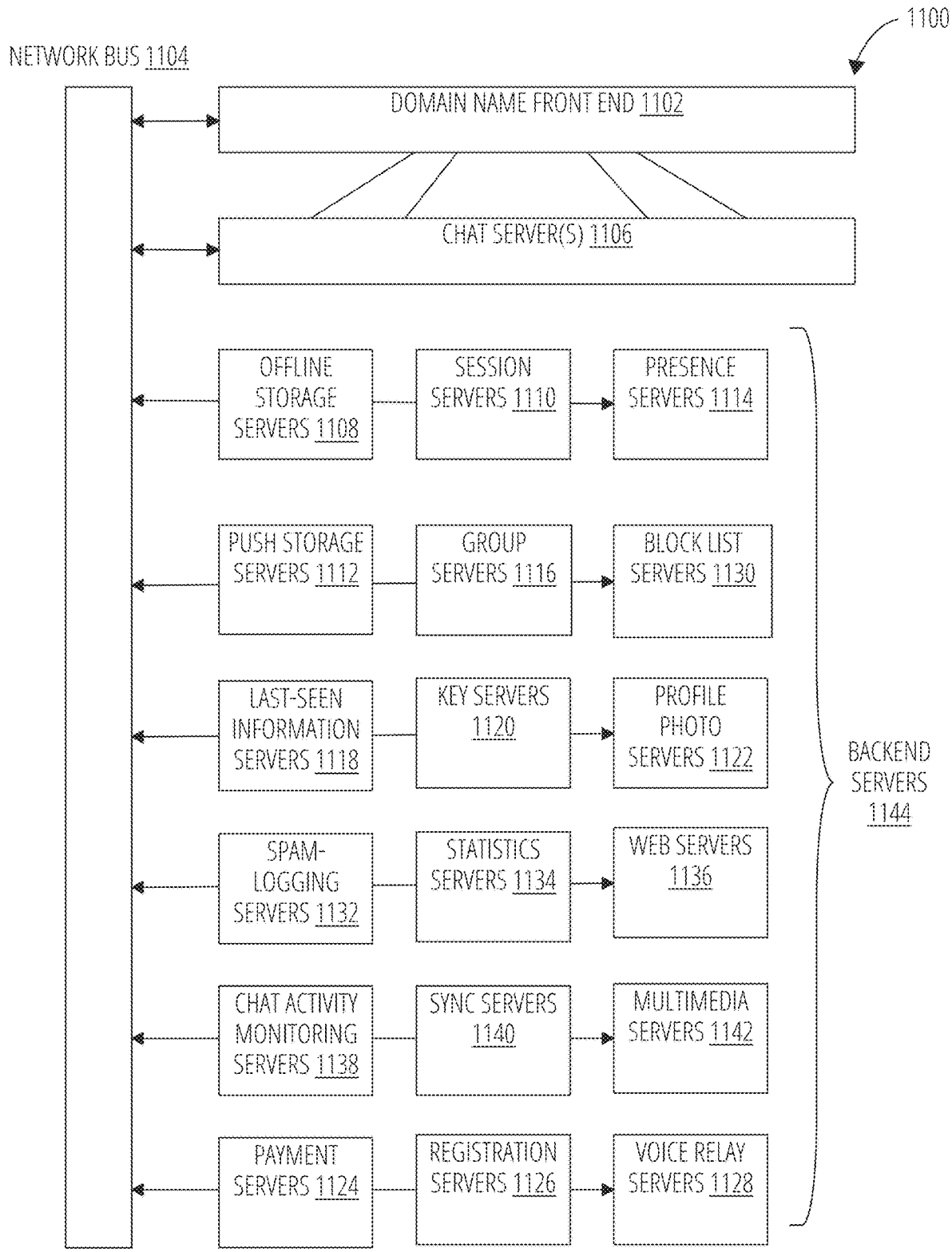
FIG. 11 illustrates an exemplary messaging service 1100 in accordance with one embodiment.

FIG. 11 illustrates an embodiment of a plurality of servers implementing various functions of a messaging service 1100 suitable for use with exemplary embodiments. It will be appreciated that different distributions of work and functions may be used in various embodiments of a messaging service 1100.

The messaging service 1100 may comprise a domain name front end 1102. The domain name front end 1102 may be assigned one or more domain names associated with the messaging service 1100 in a domain name system (DNS). The domain name front end 1102 may receive incoming connections and distribute the connections to servers providing various messaging services.

The messaging service 1100 may comprise one or more chat server(s) 1106. The chat server(s) 1106 may comprise front-end servers for receiving and transmitting user-to-user messaging updates such as chat messages. Incoming connections may be assigned to the chat server(s) 1106 by the domain name front end 1102 based on workload balancing.

The messaging service 1100 may comprise backend servers 1144. The backend servers 1144 may perform specialized tasks in the support of the chat operations of the front-end chat server(s) 1106. A plurality of different types of backend servers 1144 may be used. It will be appreciated that the assignment of types of tasks to different backend servers 1144 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated backend servers 1144 described herein may be divided between different servers of different server groups.

The messaging service 1100 may comprise one or more offline storage servers 1108. The one or more offline storage servers 1108 may store messaging content for currently-offline messaging clients in hold for when the messaging clients reconnect.

The messaging service 1100 may comprise one or more session servers 1110. The one or more session servers 1110 may maintain a session state of connected messaging clients.

The messaging service 1100 may comprise one or more presence servers 1114. The one or more presence servers 1114 may maintain presence information for the messaging service 1100. Presence information may correspond to user-specific information indicating whether or not a given user has an online messaging client and is available for chatting, has an online messaging client but is currently away from it, does not have an online messaging client, and any other presence state.

The messaging service 1100 may comprise one or more push storage servers 1112. The one or more push storage servers 1112 may cache push requests and transmit the push requests to messaging clients. Push requests may be used to wake messaging clients, to notify messaging clients that a messaging update is available, and to otherwise perform server-side-driven interactions with messaging clients.

The messaging service 1100 may comprise one or more group servers 1116. The one or more group servers 1116 may maintain lists of groups, add users to groups, remove users from groups, and perform the reception, caching, and forwarding of group chat messages.

The messaging service 1100 may comprise one or more block list servers 1130. The one or more block list servers 1130 may maintain user-specific block lists, the user-specific incoming-block lists indicating for each user the one or more other users that are forbidden from transmitting messages to that user. Alternatively or additionally, the one or more block list servers 1130 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 1100 may comprise one or more last seen last-seen information servers 1118. The one or more last seen last-seen information servers 1118 may receive, store, and maintain information indicating the last seen location, status, messaging client, and other elements of a user's last seen connection to the messaging service 1100.

The messaging service 1100 may comprise one or more key servers 1120. The one or more key servers may host public keys for public/private key encrypted communication.

The messaging service 1100 may comprise one or more profile photo servers 1122. The one or more profile photo servers 1122 may store and make available for retrieval profile photos for the plurality of users of the messaging service 1100.

The messaging service 1100 may comprise one or more spam-logging servers 1132. The one or more spam-logging servers 1132 may log known and suspected spam (e.g., unwanted messages, particularly those of a promotional nature). The one or more spam-logging servers 1132 may be operative to analyze messages to determine whether they are spam and to perform punitive measures, in some embodiments, against suspected spammers (users that send spam messages).

The messaging service 1100 may comprise one or more statistics servers 1134. The one or more statistics servers may compile and store statistics information related to the operation of the messaging service 1100 and the behavior of the users of the messaging service 1100.

The messaging service 1100 may comprise one or more web servers 1136. The one or more web servers 1136 may engage in hypertext transport protocol (HTTP) and hypertext transport protocol secure (HTTPS) connections with web browsers.

The messaging service 1100 may comprise one or more chat activity monitoring servers 1138. The one or more chat activity monitoring servers 1138 may monitor the chats of users to determine unauthorized or discouraged behavior by the users of the messaging service 1100. The one or more chat activity monitoring servers 1138 may work in cooperation with the spam-logging servers 1132 and block list servers 1130, with the one or more chat activity monitoring servers 1138 identifying spam or other discouraged behavior and providing spam information to the spam-logging servers 1132 and blocking information, where appropriate to the block list servers 1130.

The messaging service 1100 may comprise one or more sync servers 1140. The one or more sync servers 1140 may sync the messaging service 1100 with contact information from a messaging client, such as an address book on a mobile phone, to determine contacts for a user in the messaging service 1100.

The messaging service 1100 may comprise one or more multimedia servers 1142. The one or more multimedia servers may store multimedia (e.g., images, video, audio) in transit between messaging clients, multimedia cached for offline endpoints, and may perform transcoding of multimedia.

The messaging service 1100 may comprise one or more payment servers 1124. The one or more payment servers 1124 may process payments from users. The one or more payment servers 1124 may connect to external third-party servers for the performance of payments.

The messaging service 1100 may comprise one or more registration servers 1126. The one or more registration servers 1126 may register new users of the messaging service 1100.

The messaging service 1100 may comprise one or more voice relay servers 1128. The one or more voice relay servers 1128 may relay voice-over-internet-protocol (VoIP) voice communication between messaging clients for the performance of VoIP calls.

In some embodiments, the messaging service 1100 may be an end-to-end encrypted (E2EE) messaging service, in which a sending device encrypts information for decryption by a receiving device. The intermediate servers of the messaging service 1100 may assist in the setup of an E2EE session, and may facilitate delivery of communications between the devices, but may be unable to decrypt (and therefore access) the content of the communications. In an E2EE environment, some adjustments may need to be made to procedures that would be performed by the server in a non-E2EE environment (eliminating these procedures, adjusting them, or moving them to one or more of the client devices).

Figure 12:
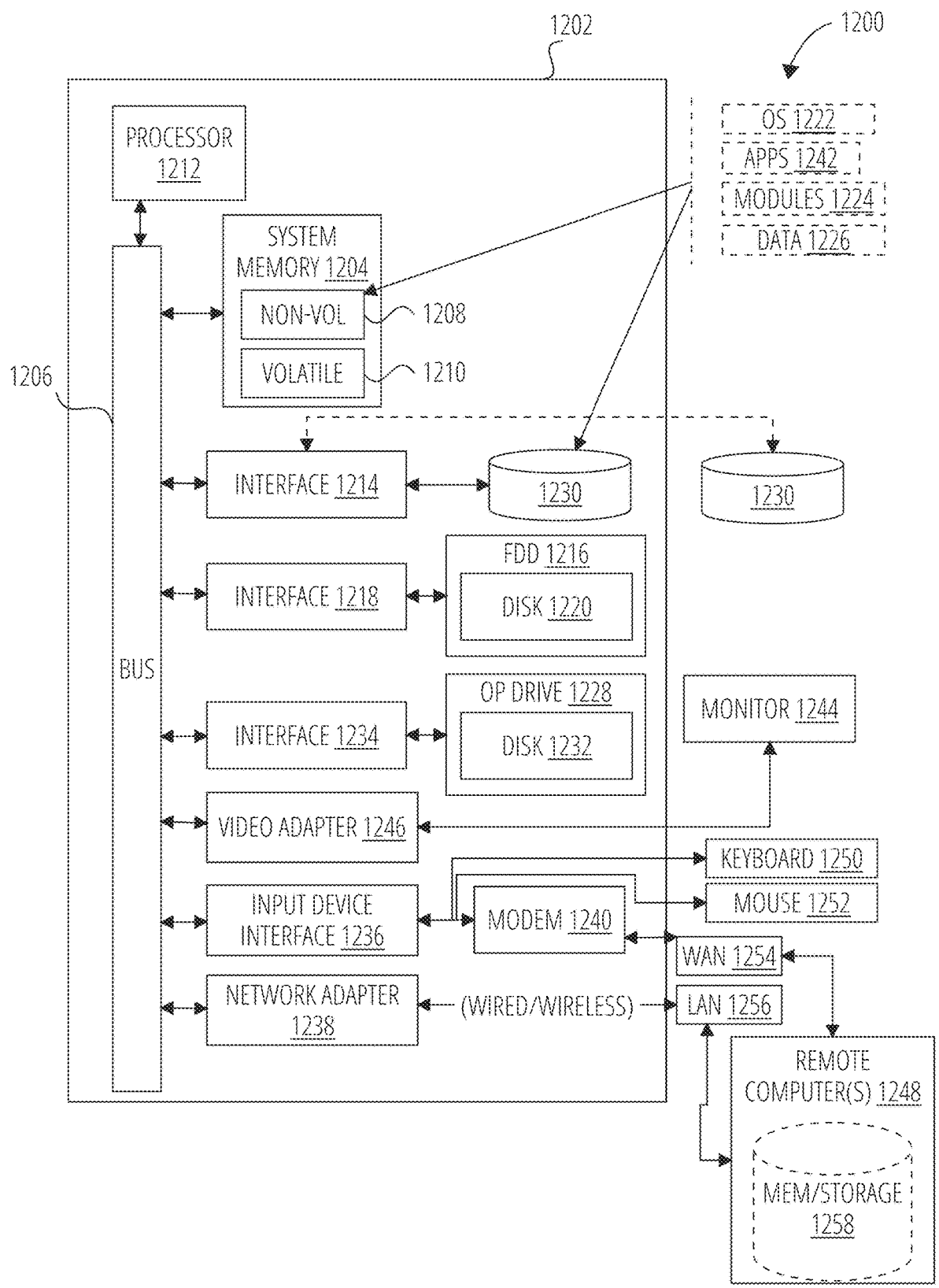
FIG. 12 illustrates a computer architecture 1200 in accordance with one embodiment.

FIG. 12 illustrates an embodiment of an exemplary computer architecture 1200 suitable for implementing various embodiments as previously described. In one embodiment, the computer architecture 1200 may include or be implemented as part of system 100 and/or system 200.

As used in this application, the terms "system" and "component" are intended to refer to a computer-related entity, either hardware, a combination of hardware and software, software, or software in execution, examples of which are provided by the exemplary computing computer architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 includes a processor 1212, a system memory 1204 and a system bus 1206. The processor 1212 can be any of various commercially available processors.

The system bus 1206 provides an interface for system components including, but not limited to, the system memory 1204 to the processor 1212. The system bus 1206 can be any of several types of bus structure that may further interconnect to a memory bus (with or without a memory controller), a peripheral bus, and a local bus using any of a variety of commercially available bus architectures. Interface adapters may connect to the system bus 1206 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1200 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1204 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1204 can include non-volatile 1208 and/or volatile 1210. A basic input/output system (BIOS) can be stored in the non-volatile 1208.

The computer 1202 may include various types of computer-readable storage media in the form of one or more lower speed memory units, including an internal (or external) hard disk drive 1230, a magnetic disk drive 1216 to read from or write to a removable magnetic disk 1220, and an optical disk drive 1228 to read from or write to a removable optical disk 1232 (e.g., a CD-ROM or DVD). The hard disk drive 1230, magnetic disk drive 1216 and optical disk drive 1228 can be connected to system bus 1206 the by an HDD interface 1214, and FDD interface 1218 and an optical disk drive interface 1234, respectively. The HDD interface 1214 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1208, and volatile 1210, including an operating system 1222, one or more applications 1242, other program modules 1224, and program data 1226. In one embodiment, the one or more applications 1242, other program modules 1224, and program data 1226 can include, for example, the various applications and/or components of the system 100 and system 200, such as the specification files 102, compiler 104, server messaging application 106, the client messaging application 108, the mock server 110, the validation component 112, and the registry 114.

A user can enter commands and information into the computer 1202 through one or more wire/wireless input devices, for example, a keyboard 1250 and a pointing device, such as a mouse 1252. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, and the like. These and other input devices are often connected to the processor 1212 through an input device interface 1236 that is coupled to the system bus 1206 but can be connected by other interfaces such as a parallel port, IEEE 1394 serial port, a game port, a USB port, an IR interface, and so forth.

A monitor 1244 or other type of display device is also connected to the system bus 1206 via an interface, such as a video adapter 1246. The monitor 1244 may be internal or external to the computer 1202. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all the elements described relative to the computer 1202, although, for purposes of brevity, only a memory and/or storage device 1258 is illustrated. The logical connections depicted include wire/wireless connectivity to a local area network 1256 and/or larger networks, for example, a wide area network 1254. Such LAN and WAN networking environments are commonplace in offices and companies, and facilitate enterprise-wide computer networks, such as intranets, all of which may connect to a global communications network, for example, the Internet.

When used in a local area network 1256 networking environment, the computer 1202 is connected to the local area network 1256 through a wire and/or wireless communication network interface or network adapter 1238. The network adapter 1238 can facilitate wire and/or wireless communications to the local area network 1256, which may also include a wireless access point disposed thereon for communicating with the wireless functionality of the network adapter 1238.

When used in a wide area network 1254 networking environment, the computer 1202 can include a modem 1240, or is connected to a communications server on the wide area network 1254 or has other means for establishing communications over the wide area network 1254, such as by way of the Internet. The modem 1240, which can be internal or external and a wire and/or wireless device, connects to the system bus 1206 via the input device interface 1236. In a networked environment, program modules depicted relative to the computer 1202, or portions thereof, can be stored in the remote memory and/or storage device 1258. It will be appreciated that the network connections shown are exemplary and other means of establishing a communications link between the computers can be used.

The computer 1202 is operable to communicate with wired and wireless devices or entities using the IEEE 802 family of standards, such as wireless devices operatively disposed in wireless communication (e.g., IEEE 802.11 over-the-air modulation techniques). This includes at least Wi-Fi® (or Wireless Fidelity), WiMax®, and Bluetooth® wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-10 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 13:
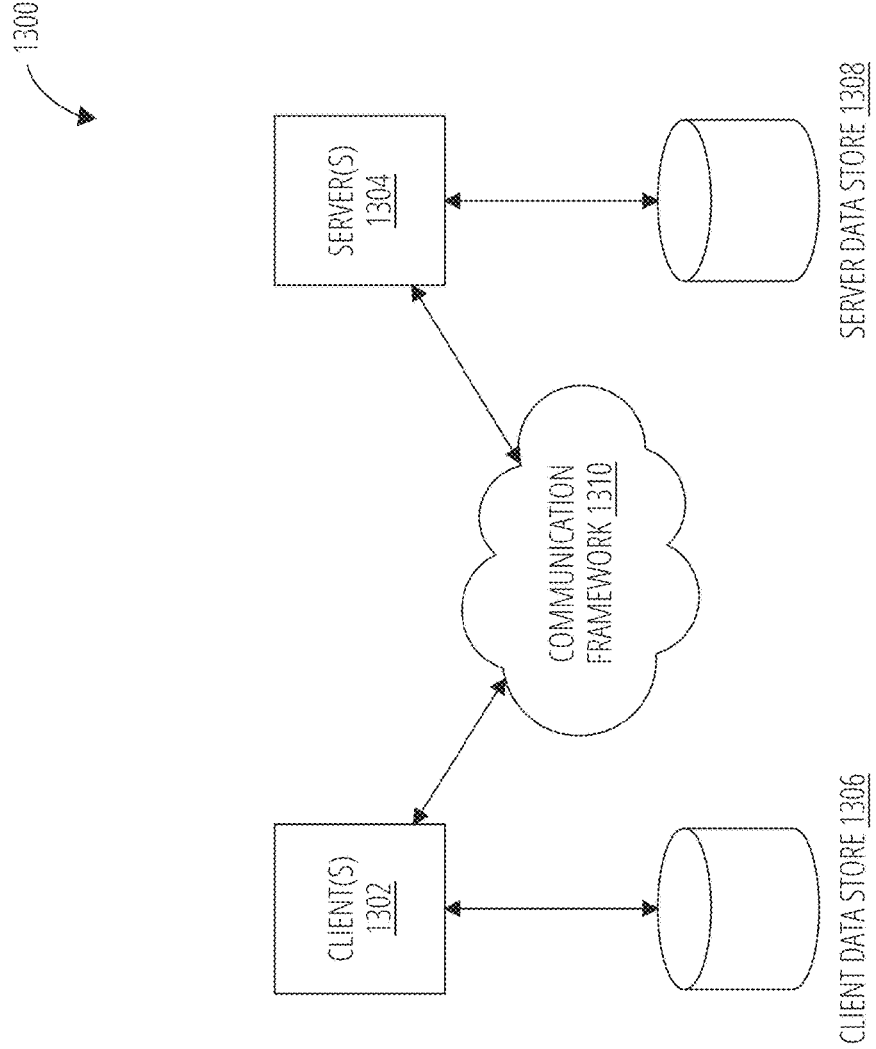
FIG. 13 illustrates a communications architecture 1300 in accordance with one embodiment.

FIG. 13 is a block diagram depicting an exemplary communications architecture 1300 suitable for implementing various embodiments as previously described. The communications architecture 1300 includes various common communications elements, such as a transmitter, receiver, transceiver, radio, network interface, baseband processor, antenna, amplifiers, filters, power supplies, and so forth. The embodiments, however, are not limited to implementation by the communications architecture 1300, which may be consistent with systems 100, 200, and/or messaging service 1100.

As shown in FIG. 13, the communications architecture 1300 includes one or more client(s) 1302 and server(s) 1304. The server(s) 1304 may implement one or more devices of system 200. The client(s) 1302 and the server(s) 1304 are operatively connected to one or more respective client data store 1306 and server data store 1308 that can be employed to store information local to the respective client(s) 1302 and server(s) 1304, such as cookies and/or associated contextual information.

The client(s) 1302 and the server(s) 1304 may communicate information between each other using a communication framework 1310. The communication framework 1310 may implement any well-known communications techniques and protocols. The communication framework 1310 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1310 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1100 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by client(s) 1302 and the server(s) 1304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a computer as selectively activated or reconfigured by a computer program stored in the computer. The procedures presented herein are not inherently related to a particular computer or other apparatus. Various machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
   generating, by a messaging client executing on a processor of a client device, a request stanza based on a first specification file of a plurality of specification files for the messaging client, wherein the first specification file for the messaging client comprises a mixin element, wherein at least one other element of the first specification file comprises a reference to the mixin element;
   validating, by the messaging client, the request stanza based on one or more parameters specified by the first specification file;
   invoking, by the messaging client, a response handler for the request stanza;
   receiving, by the messaging client, a response stanza from a server, wherein the messaging client and the server communicate according to an open communication protocol;
   processing, by the response handler, the response stanza; and
   displaying, by the messaging client, an output of the processing of the response handler.

2. The method of claim 1, wherein the server comprises a mock server component of the messaging client executing on the processor, wherein the mock server generates the response stanza by:
   matching one or more attributes of the request stanza to a first specification file of a plurality of specification files for the server;
   generating the response stanza based on the first specification file for the server; and
   providing the response stanza to the messaging client.

3. The method of claim 2, further comprising:
   generating, by a compiler, the messaging client based on the plurality of specification files for the messaging client;
   generating, by the compiler, the mock server based on the plurality of specification files for the server; and
   generating, by the compiler, a server messaging application based on the plurality of specification files for the server.

4. The method of claim 1, further comprising prior to receiving the response stanza:
   encoding, by the messaging client, the request stanza into a byte array comprising a plurality of bytes;
   encrypting, by the messaging client, at least one byte of the plurality of bytes of the byte array; and
   transmitting, by the messaging client, the byte array including the at least one encrypted byte to the server.

5. The method of claim 1, further comprising:
   generating, by the messaging client, another request stanza based on the first specification file for the messaging client;
   invalidating, by a validation component of the messaging client, the another request stanza based on the first specification file for the messaging client; and
   dropping, by the messaging client, the another request stanza, wherein dropping the another request stanza causes the processor to refrain from processing the another request stanza.

6. The method of claim 1, further comprising:
   receiving a second response stanza from the server;
   determining, by the messaging client, that a unique identifier of the second response stanza is not stored in a registry;

invoking, by the messaging client, a decision tree to determine one or more remote procedure calls for the second response stanza and the response handler for the one or more remote procedure calls for the second response stanza; and invoking, by the messaging client, the one or more remote procedure calls for the second response stanza and the response handler for the one or more remote procedure calls to process the second response stanza.

7. A non-transitory computer-readable storage medium, the computer-readable storage medium including instructions that when executed by a processor of a client device, cause the processor to:

generate, by a messaging client executing on the processor, a request stanza based on a first specification file of a plurality of specification files for the messaging client;

validate, by the messaging client, the request stanza based on one or more parameters specified by the first specification file;

invoke, by the messaging client, a response handler for the request stanza;

receive, by the messaging client, a response stanza from a server;

process, by the response handler, the response stanza;

display, by the messaging client, an output of the processing of the response handler;

receive a second response stanza from the server;

determine, by the messaging client, that a unique identifier of the second response stanza is not stored in a registry;

invoke, by the messaging client, a decision tree to determine a remote procedure call (RPC) for the second response stanza and a response handler for the RPC; and invoke, by the messaging client, the RPC for the second response stanza and the response handler for the RPC to process the second response stanza.

8. The computer-readable storage medium of claim 7, wherein the server comprises a mock server component of the messaging client execute on the processor, wherein the mock server generates the response stanza by:

matching one or more attributes of the request stanza to a first specification file of a plurality of specification files for the server;

generating the response stanza based on the first specification file for the server; and providing the response stanza to the messaging client.

9. The computer-readable storage medium of claim 8, wherein the instructions further configure the processor to:

generate, by a compiler executing on the processor, the messaging client based on the plurality of specification files for the messaging client;

generate, by the compiler, the mock server based on the plurality of specification files for the server; and generate, by the compiler, a server messaging application based on the plurality of specification files for the server.

10. The computer-readable storage medium of claim 7, wherein the instructions further configure the processor to prior to receiving the response stanza:

encode, by the messaging client, the request stanza into a byte array comprising a plurality of bytes;

encrypt, by the messaging client, at least one byte of the plurality of bytes of the byte array; and transmit, by the messaging client, the byte array including the at least one encrypted byte to the server.

11. The computer-readable storage medium of claim 7, wherein the instructions further configure the processor to:

generate, by the messaging client, another request stanza based on the first specification file for the messaging client;

invalidate, by a validation component of the messaging client, the another request stanza based on the first specification file for the messaging client; and drop, by the messaging client, the another request stanza, wherein dropping the another request stanza causes the processor to refrain from processing the another request stanza.

12. The computer-readable storage medium of claim 7, wherein the first specification file for the messaging client comprises a mixin element, wherein at least one other element of the first specification file comprises a reference to the mixin element, wherein the messaging client and the server communicate according to an open communication protocol.

13. A computing apparatus comprising:

a processor; and a memory storing instructions that, when executed by the processor, configure the processor to:

generate, by a messaging client executing on the processor, a request stanza based on a first specification file of a plurality of specification files for the messaging client;

validate, by the messaging client, the request stanza based on one or more parameters specified by the first specification file;

invoke, by the messaging client, a response handler for the request stanza;

encode, by the messaging client, the request stanza into a byte array comprising a plurality of bytes;

encrypt, by the messaging client, at least one byte of the plurality of bytes of the byte array; and transmit, by the messaging client, the byte array including the at least one encrypted byte to a server;

receive, by the messaging client, a response stanza from the server;

process, by the response handler, the response stanza; and display, by the messaging client, an output of the processing of the response handler.

14. The computing apparatus of claim 13, wherein the server comprises a mock server component of the messaging client executing on the processor, wherein the mock server generates the response stanza by:

matching one or more attributes of the request stanza to a first specification file of a plurality of specification files for the server;

generating the response stanza based on the first specification file for the server; and providing the response stanza to the messaging client.

15. The computing apparatus of claim 14, wherein the instructions further configure the processor to:

generate, by a compiler, the messaging client based on the plurality of specification files for the messaging client;

generate, by the compiler, the mock server based on the plurality of specification files for the server; and generate, by the compiler, a server messaging application based on the plurality of specification files for the server.

16. The computing apparatus of claim 13, wherein the instructions further configure the processor to:

generate, by the messaging client, another request stanza based on the first specification file for the messaging client;

invalidate, by a validation component of the messaging client, the another request stanza based on the first specification file for the messaging client; and drop, by the messaging client, the another request stanza, wherein dropping the another request stanza causes the processor to refrain from processing the another request stanza.

17. The computing apparatus of claim 13, wherein the instructions further configure the processor to:

receive a second response stanza from the server;

determine, by the messaging client, that a unique identifier of the second response stanza is not stored in a registry;

invoke, by the messaging client, a decision tree to determine one or more remote procedure calls for the second response stanza and the response handler for the one or more remote procedure calls for the second response stanza; and invoke, by the messaging client, the one or more remote procedure calls for the second response stanza and the response handler for the one or more remote procedure calls to process the second response stanza.

18. The computing apparatus of claim 13, wherein the first specification file for the messaging client comprises a mixin element, wherein at least one other element of the first specification file comprises a reference to the mixin element, wherein the messaging client and the server communicate according to an open communication protocol.

\* \* \* \* \*